United States Patent
Benantar

(10) Patent No.: US 8,185,938 B2
(45) Date of Patent: May 22, 2012

(54) METHOD AND SYSTEM FOR NETWORK SINGLE-SIGN-ON USING A PUBLIC KEY CERTIFICATE AND AN ASSOCIATED ATTRIBUTE CERTIFICATE

(75) Inventor: Messaoud Benantar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2864 days.

(21) Appl. No.: 09/821,064

(22) Filed: Mar. 29, 2001

(65) Prior Publication Data

US 2002/0144119 A1    Oct. 3, 2002

(51) Int. Cl.
*G06F 7/04* (2006.01)
(52) U.S. Cl. ............................... 726/8; 713/156
(58) Field of Classification Search .............. 713/171, 713/156; 726/8
See application file for complete search history.

(56) References Cited

U.S. PATENT DOCUMENTS

| | | | | |
|---|---|---|---|---|
| 5,339,403 A * | 8/1994 | Parker | | 711/221 |
| 6,460,141 B1 * | 10/2002 | Olden | | 726/4 |
| 6,691,232 B1 * | 2/2004 | Wood et al. | | 726/6 |
| 6,754,829 B1 * | 6/2004 | Butt et al. | | 713/200 |
| 6,766,454 B1 * | 7/2004 | Riggins | | 713/185 |
| 7,028,180 B1 * | 4/2006 | Aull et al. | | 713/156 |

* cited by examiner

*Primary Examiner* — Christopher Brown
(74) *Attorney, Agent, or Firm* — Hamilton & Terrile, LLP; Michael Rocco Cannatti

(57) ABSTRACT

A methodology is presented for a network single sign-on (SSO) authentication process using digital certificates. A user has access to protected resources, such as legacy applications, that require verification of a user's authentication data prior to providing access. The user's authentication data is encrypted using the public key of the user, and an attribute certificate containing the encrypted authentication data is generated by an attribute-certificate-issuing authority. When a user requires access to the protected resource, an SSO agent performs an initial authentication process against the user. The SSO agent then retrieves the user's attribute certificate, and for subsequent authentication requests for other protected resources, the SSO agent uses the authentication data from the attribute certificate that corresponds to the targeted protected resource. The SSO agent forwards the required authentication data to the protected resource, and the protected resource then authenticates a user based on the provided authentication data.

2 Claims, 10 Drawing Sheets

```
Certificate   ::=   SEQUENCE   {
      tbsCertificate            TBSCertificate,
      signatureAlgorithm        AlgorithmIdentifier,
      signature                 BIT STRING  }

TBSCertificate   ::=   SEQUENCE   {
      version            [0]    Version DEFAULT v1,
      serialNumber              CertificateSerialNumber,
      signature                 AlgorithmIdentifier,
      issuer                    Name,
      validity                  Validity,
      subject                   Name,
      subjectPublicKeyInfo      SubjectPublicKeyInfo,
      issuerUniqueID     [1]    IMPLICIT UniqueIdentifier OPTIONAL,
      subjectUniqueID    [2]    IMPLICIT UniqueIdentifier OPTIONAL,
      extensions         [3]    Extensions OPTIONAL     }

Version   ::=   INTEGER   {  v1(0), v2(1), v3(2)   }

CertificateSerialNumber   ::=   INTEGER

Validity ::= SEQUENCE {
      notBefore                 Time,
      notAfter                  Time  }

Time ::= CHOICE {
      utcTime                   UTCTime,
      generalTime               GeneralizedTime  }

UniqueIdentifier   ::=   BIT STRING

SubjectPublicKeyInfo   ::=   SEQUENCE  {
      algorithm                 AlgorithmIdentifier,
      subjectPublicKey          BIT STRING  }

Extensions   ::=   SEQUENCE SIZE (1..MAX) OF Extension

Extension   ::=   SEQUENCE  {
      extnID                    OBJECT IDENTIFIER,
      critical                  BOOLEAN DEFAULT FALSE,
      extnValue                 OCTET STRING  }
```

*FIG. 4A*
*(PRIOR ART)*

```
AttributeCertificate ::= SEQUENCE {
      acinfo                AttributeCertificateInfo,
      signatureAlgorithm    AlgorithmIdentifier,
      signatureValue        BIT STRING
}

AttributeCertificateInfo ::= SEQUENCE {
      version               AttCertVersion DEFAULT v1,
      holder                Holder,
      issuer                AttCertIssuer,
      signature             AlgorithmIdentifier,
      serialNumber          CertificateSerialNumber,
      attrCertValidityPeriod AttCertValidityPeriod,
      attributes            SEQUENCE OF Attribute,
      issuerUniqueID        UniqueIdentifier OPTIONAL,
      extensions            Extensions OPTIONAL
}

AttCertVersion ::= INTEGER { v1(0), v2(1) }

Holder ::= SEQUENCE {
      baseCertificateID    [0] IssuerSerial OPTIONAL,
                               -- the issuer and serial number of
                               -- the holder's Public Key Certificate
      entityName           [1] GeneralNames OPTIONAL,
                               -- the name of the claimant or role
      objectDigestInfo     [2] ObjectDigestInfo OPTIONAL
                               -- if present, version must be v2
}

ObjectDigestInfo ::= SEQUENCE {
      digestedObjectType  ENUMERATED {
      publicKey               (0),
      publicKeyCert           (1),
      otherObjectTypes        (2) },
                              -- otherObjectTypes MUST NOT
                              -- be used in this profile
      otherObjectTypeID   OBJECT IDENTIFIER OPTIONAL,
      digestAlgorithm     AlgorithmIdentifier,
      objectDigest        BIT STRING
}
```

*FIG. 4B*

*(PRIOR ART)*

```
AttCertIssuer ::= CHOICE {
    v1Form          GeneralNames,  -- v1 or v2
    v2Form      [0] V2Form         -- v2 only
}

V2Form ::= SEQUENCE {
    issuerName          GeneralNames OPTIONAL,
    baseCertificateID   [0] IssuerSerial OPTIONAL,
    objectDigestInfo    [1] ObjectDigestInfo OPTIONAL
            -- at least one of issuerName, baseCertificateID
            -- or objectDigestInfo MUST be present}

IssuerSerial ::= SEQUENCE {
    issuer      GeneralNames,
    serial      CertificateSerialNumber,
    issuerUID   UniqueIdentifier OPTIONAL
}

AttCertValidityPeriod ::= SEQUENCE {
    notBeforeTime   GeneralizedTime,
    notAfterTime    GeneralizedTime
}

Attribute ::= SEQUENCE {
    type    AttributeType,
    values  SET OF AttributeValue
            -- at least one value is required
}

AttributeType ::= OBJECT IDENTIFIER

AttributeValue ::= ANY DEFINED BY AttributeType
```

*FIG. 4C*
(PRIOR ART)

```
name        id-aca-authenticationInfo
OID         { id-aca 1 }
Syntax      SvceAuthInfo
values:     Multiple allowed SvceAuthInfo ::=    SEQUENCE {
    service     GeneralName,
    ident       GeneralName,
    authInfo    OCTET STRING OPTIONAL
}
```

*FIG. 4D*
(PRIOR ART)

METHOD AND SYSTEM FOR NETWORK SINGLE-SIGN-ON USING A PUBLIC KEY CERTIFICATE AND AN ASSOCIATED ATTRIBUTE CERTIFICATE

BACKGROUND OF THE INVENTION

1. Field of the Invention

The present invention relates to an improved data processing system and, in particular, to a method and apparatus for multicomputer data transferring. Still more particularly, the present invention provides a method and apparatus for computer-to-computer authentication and authorization.

2. Description of Related Art

In virtually every networking system, an administrative system protects resources by restricting access to those resources, which requires authentication of a user when the user wants to access a protected resource. A large network within an enterprise may have many types of protected resources to be accessed: physical resources, such as client machines; and logical resources, such as computer programs. Each protected resource may have its own authentication scheme in which each user is assigned a username and password. Rather than inefficiently requiring users to remember numerous usernames and passwords, centralized authentication systems have been developed.

In a centralized authentication system, the user is required to sign-on once, and the user is provided with access to protected resources based on credentials stored on a global server. Whenever a protected resource needs to be accessed, the credentials are retrieved from the database on the global server and provided to a security service to authenticate the user. This generally occurs in the background without the need for any intervention by the user and is usually termed a "single sign-on" (SSO) system.

Commercial use of the Internet is increasing dramatically. Web-based and Internet-based applications have now become so commonplace that when one learns of a new product or service, one assumes that the product or service will incorporate Internet functionality into the product or service. One of the factors influencing the growth of the Internet is the adherence to open standards for much of the Internet infrastructure. Individuals, public institutions, and commercial enterprises alike are able to introduce new content, products, and services that are quickly integrated into the digital infrastructure because of their ability to exploit common knowledge of open standards. For example, an open standard promulgated for protecting electronic information is the X.509 standard for digital certificates.

An X.509 digital certificate is an International Telecommunications Union (ITU) standard that has been adopted by the Internet Engineering Task Force (IETF) body. It cryptographically binds the certificate holder, presumably the subject name within the certificate, with its public cryptographic key. This cryptographic binding is based on the involvement of a trusted entity in the Internet Public Key Infrastructure (PKIX) called the "Certifying Authority". As a result, a strong and trusted association between the certificate holder and its public key can become public information yet remain tamper-proof and reliable. An important aspect of this reliability is a digital signature that the Certifying Authority stamps on a certificate before it is released for use. Subsequently, whenever the certificate is presented to a system for use of a service, its signature is verified before the subject holder is authenticated. After the authentication process is successfully completed, the certificate holder may be provided access to certain information or services, i.e. the certificate holder may be authorized to access protected resources.

A standard for an X.509 Attribute Certificate has been proposed by which attribute certificates would be similar in structure to public key certificates but in which the attribute certificate would not contain a public key. An attribute certificate would be used to certify or otherwise securely bind a set of authorization capabilities to its subject holder. Those capabilities are possibly authenticated and then cryptographically verified by a target service sought by the holder of the attribute certificate, and the attribute certificate may then be used for authorized access to protected resources.

Many legacy systems have been modified to operate with open standard functionality, such as X.509 certificates, so that system services are widely available yet secure. However, although an updated legacy system may be more conveniently accessed through the Internet or through a corporate intranet, there may be justifiable economic or personnel reasons for not modifying certain systems. Hence, many enterprises have legacy systems that are being maintained but not updated with new technologies.

As noted above, many administrative systems, including most legacy administrative systems, ensure secure access through the use of a password or other secret or secure information, such as biometric identifiers, that must be simultaneously asserted along with a user's identity. Since an individual may have many identities on different legacy systems, an enterprise's information technology infrastructure may be confusing to the average user and relatively inconvenient to use, which can present barriers to enterprise-wide goals of enhancing efficiency and workflow compared with newer or updated interconnected systems that employ open standards for authentication and authorization.

Therefore, it would be advantageous to have a method and system in which secure user access to a legacy system could be provided through an interconnected system without the necessity of modifying the legacy system. It would be particularly advantageous to use the trusted relationships associated with digital certificates in order to authenticate and authorize user access to these legacy systems using a single sign-on methodology that employs digital certificates.

SUMMARY OF THE INVENTION

A method, a system, an apparatus, and a computer program product are presented for an authentication process. A host application or system within a distributed data processing system supports one or more protected resources, such as legacy applications, that require the verification of a user's authentication data prior to allowing the user to have access to the protected resource. The user's authentication data is encrypted using the public key of the user, and an attribute certificate containing the encrypted authentication data is generated by an attribute-certificate-issuing authority. When a user of a client application or system requires access to the protected resource, a single sign-on (SSO) agent performs an initial authentication process against the user. The SSO agent then retrieves an attribute certificate associated with the user. For subsequent authentication requests for other protected resources, the SSO agent locally uses the private key of the user to decrypt the encrypted authentication data from the attribute certificate and then forwards the required authentication data to the protected resource. The protected resource then authenticates a user based on the provided authentication data. Hence, the single sign-on methodology of the present invention does not require a logon to a network security service since the local SSO agent performs the initial logon and any subsequent authentication activities.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 4A shows some of the fields of a standard X.509 digital certificate;

FIGS. 4B-4D show some of the fields of an X.509 attribute certificate;

DETAILED DESCRIPTION OF THE INVENTION

The present invention provides a process and a system for using digital certificates for network single sign-on. As background, a typical organization of hardware and software components within a distributed data processing system is described prior to describing the present invention in more detail.

Figure 1A:
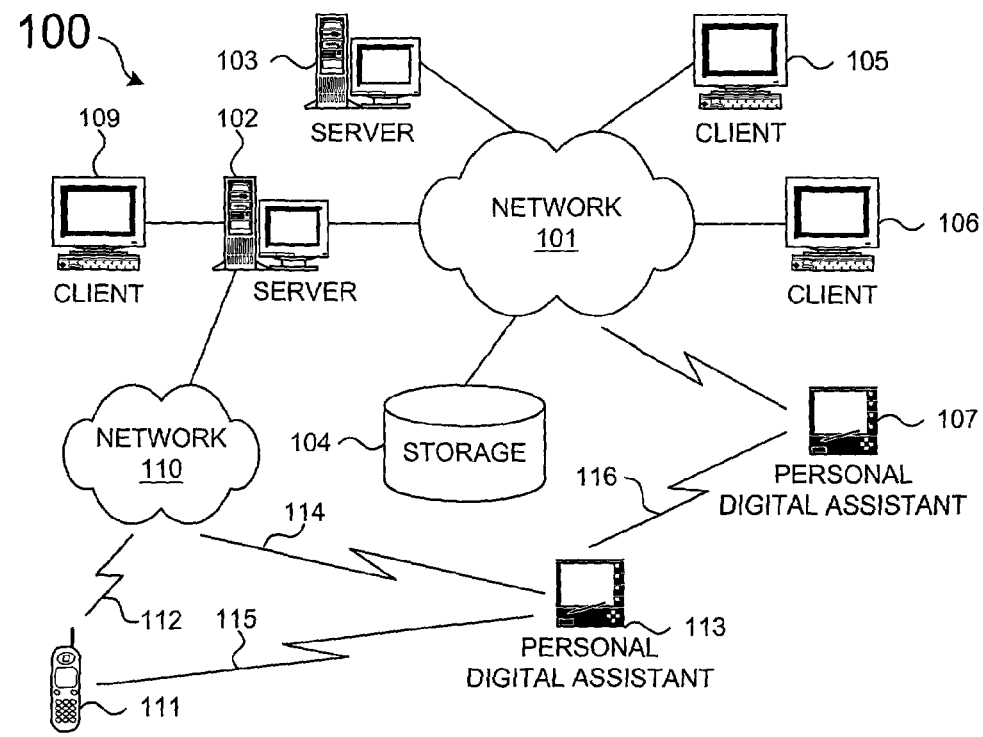
FIG. 1A depicts a typical distributed data processing system in which the present invention may be implemented.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
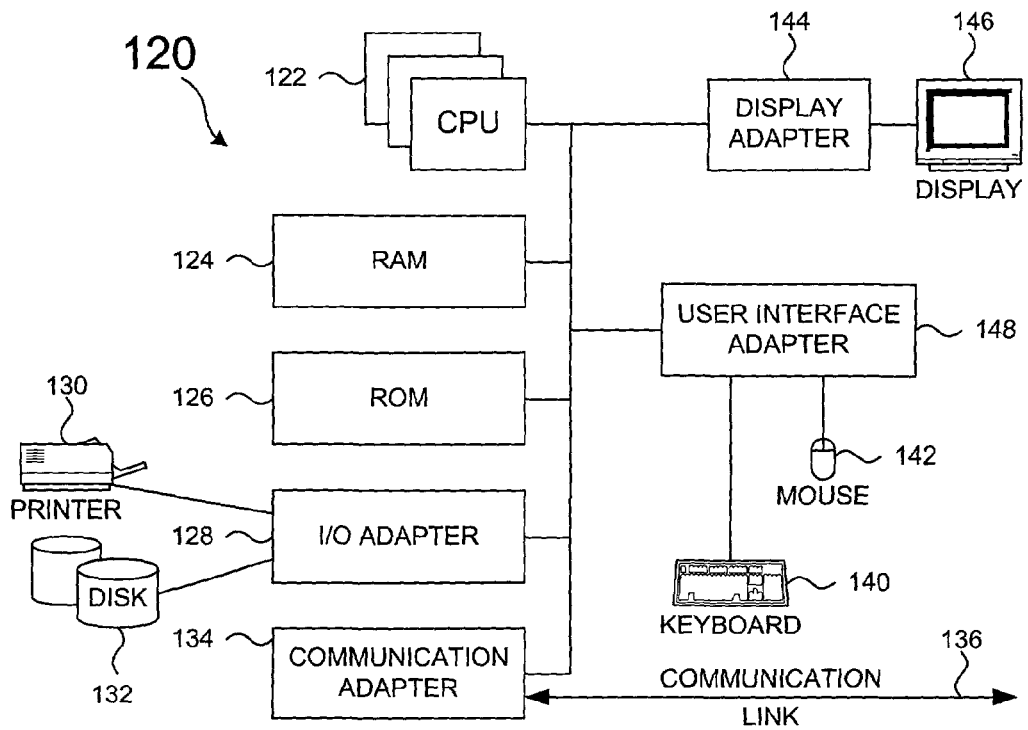
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. In other words, one of ordinary skill in the art would not expect to find similar components or architectures within a Web-enabled or network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. Hence, it should be noted that the distributed data processing system shown in FIG. 1A is contemplated as being fully able to support a variety of peer-to-peer subnets and peer-to-peer services.

The present invention may be implemented on a variety of hardware and software platforms, as described above. More specifically, though, the present invention is directed to using digital certificates for network single sign-on. To accomplish this goal, the present invention uses the trusted relationships associated with digital certificates in a novel manner to authenticate and authorize a user for controlled access to protected resources. Before describing the present invention in more detail, though, some background information about digital certificates is provided for evaluating the operational efficiencies and other advantages of the present invention.

Digital certificates support public key cryptography in which each party involved in a communication or transaction has a pair of keys, called the public key and the private key. Each party's public key is published while the private key is kept secret. Public keys are numbers associated with a particular entity and are intended to be known to everyone who needs to have trusted interactions with that entity. Private keys are numbers that are supposed to be known only to a particular entity, i.e. kept secret. In a typical public key cryptographic system, a private key corresponds to exactly one public key.

Within a public key cryptography system, since all communications involve only public keys and no private key is ever transmitted or shared, confidential messages can be generated using only public information and can be decrypted using only a private key that is in the sole possession of the intended recipient. Furthermore, public key cryptography can be used for authentication, i.e. digital signatures, as well as for privacy, i.e. encryption.

Encryption is the transformation of data into a form unreadable by anyone without a secret decryption key; encryption ensures privacy by keeping the content of the information hidden from anyone for whom it is not intended, even those who can see the encrypted data. Authentication is a process whereby the receiver of a digital message can be confident of the identity of the sender and/or the integrity of the message.

For example, when a sender encrypts a message, the public key of the receiver is used to transform the data within the original message into the contents of the encrypted message. A sender uses a public key to encrypt data, and the receiver uses a private key to decrypt the encrypted message.

When authenticating data, data can be signed by computing a digital signature from the data and the private key of the signer. Once the data is digitally signed, it can be stored with the identity of the signer and the signature that proves that the data originated from the signer. A signer uses a private key to sign data, and a receiver uses the public key to verify the signature. The present invention is directed to a form of authentication using digital certificates; some encryption is also performed during the processing within the present invention.

A certificate is a digital document that vouches for the identity and key ownership of entities, such as an individual, a computer system, a specific server running on that system, etc. Certificates are issued by certificate authorities. A certificate authority (CA) is an entity, usually a trusted third party to a transaction, that is trusted to sign or issue certificates for other people or entities. The CA usually has some kind of legal responsibilities for its vouching of the binding between a public key and its owner that allow one to trust the entity that signed a certificate. There are many such certificate authorities, such as VeriSign, Entrust, etc. These authorities are responsible for verifying the identity and key ownership of an entity when issuing the certificate.

If a certificate authority issues a certificate for an entity, the entity must provide a public key and some information about the entity. A software tool, such as specially equipped Web browsers, may digitally sign this information and send it to the certificate authority. The certificate authority might be a company like VeriSign that provides trusted third-party certificate authority services. The certificate authority will then generate the certificate and return it. The certificate may contain other information, such as dates during which the certificate is valid and a serial number. One part of the value provided by a certificate authority is to serve as a neutral and trusted introduction service, based in part on their verification requirements, which are openly published in their Certification Service Practices (CSP).

Typically, after the CA has received a request for a new digital certificate, which contains the requesting entity's public key, the CA signs the requesting entity's public key with the CA's private key and places the signed public key within the digital certificate. Anyone who receives the digital certificate during a transaction or communication can then use the public key of the CA to verify the signed public key within the certificate. The intention is that an entity's certificate verifies that the entity owns a particular public key.

The X.509 standard is one of many standards that defines the information within a certificate and describes the data format of that information. The "version" field indicates the X.509 version of the certificate format with provision for future versions of the standard. This identifies which version of the X.509 standard applies to this certificate, which affects what information can be specified in it. Thus far, three versions are defined. Version 1 of the X.509 standard for public key certificates was ratified in 1988. The version 2 standard, ratified in 1993, contained only minor enhancements to the version 1 standard. Version 3, defined in 1996, allows for flexible extensions to certificates in which certificates can be extended in a standardized and generic fashion to include additional information.

In addition to the traditional fields in public key certificates, i.e. those defined in versions 1 and 2 of X.509, version 3 comprises extensions referred to as "standard extensions". The term "standard extensions" refers to the fact that the version 3 of the X.509 standard defines some broadly applicable extensions to the version 2 certificate. However, certificates are not constrained to only the standard extensions, and anyone can register an extension with the appropriate authorities. The extension mechanism itself is completely generic.

Other aspects of certificate processing are also standardized. The Certificate Request Message Format (RFC 2511) specifies a format recommended for use whenever a relying party is requesting a certificate from a CA. Certificate Management Protocols have also been promulgated for transferring certificates. More information about the X.509 public key infrastructure (PKIX) can be obtained from the Internet Engineering Task Force (IETF) at www.ietf.org.

Figure 2:
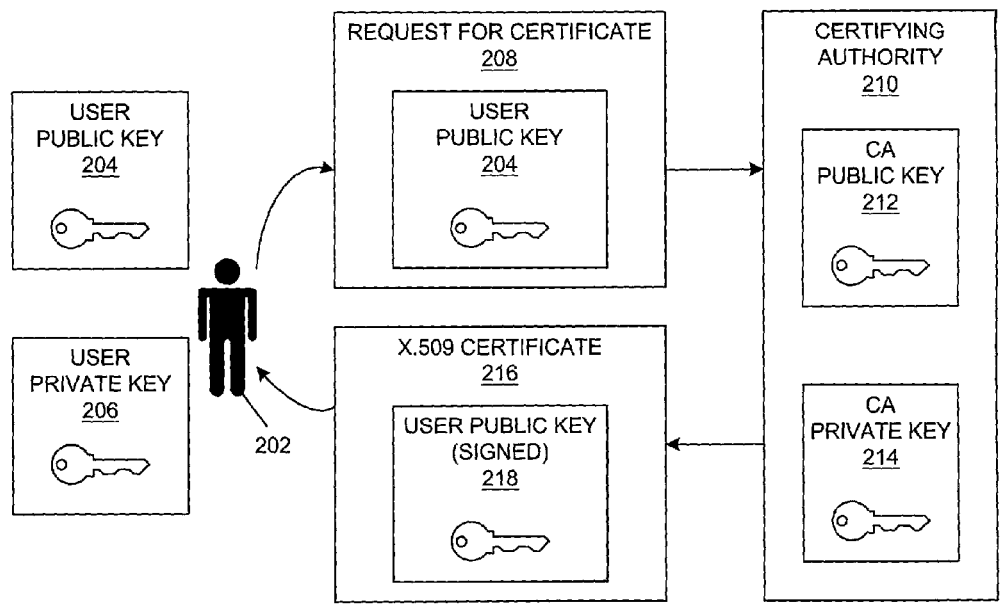
FIG. 2 depicts a typical manner in which an entity obtains a digital certificate.

With reference now to FIG. 2, a block diagram depicts a typical manner in which an individual obtains a digital certificate. User 202, operating on some type of client computer, has previously obtained or generated a public/private key pair, e.g., user public key 204 and user private key 206. User 202 generates a request for certificate 208 containing user public key 204 and sends the request to certifying authority 210, which is in possession of CA public key 212 and CA private key 214. Certifying authority 210 verifies the identity of user 202 in some manner and generates X.509 digital certificate 216 containing signed user public key 218 that was signed with CA private key 214. User 202 receives newly generated digital certificate 216, and user 202 may then publish digital certificate 216 as necessary, e.g., into an LDAP directory, to engage in trusted transactions or trusted communications. An entity that receives digital certificate 216 may verify the signature of the CA by using CA public key 212, which is published and available to the verifying entity.

Figure 3A:
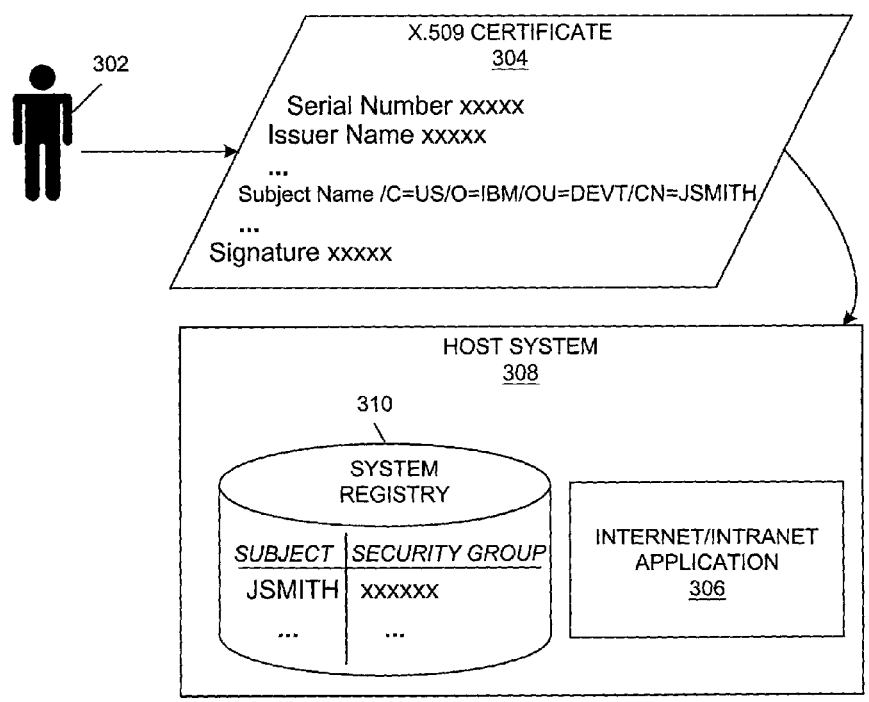
FIG. 3A is a block diagram depicting a typical manner in which an entity may use a digital certificate to be authenticated to an Internet system or application.

With reference now to FIG. 3A, a block diagram depicts a typical manner in which an entity may use a digital certificate to be authenticated to an Internet system or application. User 302 possesses X.509 digital certificate 304, which is transmitted to an Internet or intranet application 306 that comprises X.509 functionality for processing and using digital certificates and that operates on host system 308. The entity that receives certificate 304 may be an application, a system, a subsystem, etc. Certificate 304 contains a subject name or subject identifier that identifies user 302 to application 306, which may perform some type of service for user 302.

Host system 308 may also contain system registry 310 which is used to authorize user 302 for accessing services and resources within system 308, i.e. to reconcile a user's identity with user privileges. For example, a system administrator may have configured a user's identity to belong to certain a security group, and the user is restricted to being able to access only those resources that are configured to be available to the security group as a whole. Various well-known methods for imposing an authorization scheme may be employed within the system.

Figure 3B:
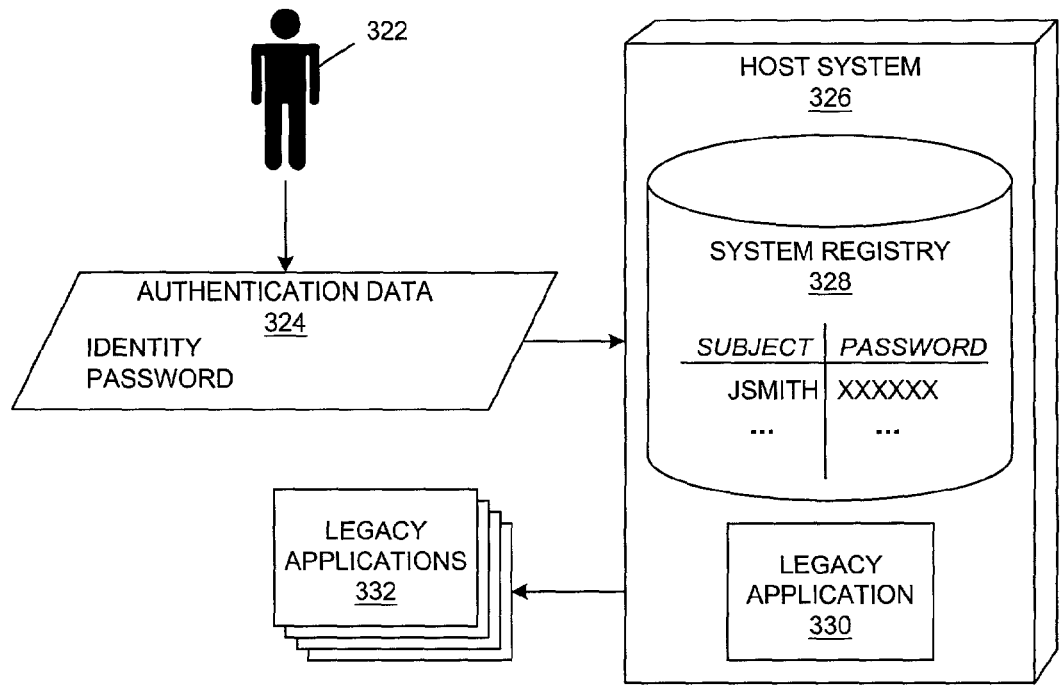
FIG. 3B is a block diagram depicting a typical manner in which an entity may use authentication data to be authenticated to a legacy system or application.

With reference now to FIG. 3B, a block diagram depicts a typical manner in which an entity may use authentication data to be authenticated to a legacy system or application. User 322 may engage in an authentication process from a client machine to other systems by sending authentication data 324 comprising identity information and some type of secret information, such as a password. Host system 326 receives authentication data 324, which can be reconciled with identity information in system registry 328, and host system 326 may then allow user 322 to use its services and resources, such as legacy application 330. User 322 may have multiple identities that are known to host system 326 for centrally authenticating to multiple systems or applications using a network single sign-on methodology, including legacy applications 332 that may reside on other servers connected to host system 326. User 322 may also have other identities known to other host systems, which would require multiple sets of authentication data similar to authentication data 324.

FIGS. 3A-3B show a problem that can arise when a user has multiple identities within an enterprise—the multiple identities may be decoupled, thereby forcing the systems within the enterprise to perform different methods of authentication. The subject name within a user's certificate is possibly unknown to many applications running on host systems, particularly legacy applications, yet the user may have an identity on the host systems. Because the user's multiple identities are decoupled, a host application server may be prevented from taking advantage of the reliable authentication methodology that an X.509 certificate provides at lower level authentication protocols, such as a Secure Socket Layer (SSL) stack.

To remedy this problem, many systems employ a middleware solution. Middleware application servers enable clients that are using new programming environments, such as HTTP and CORBA (Common Object Request Broker Architecture), to have access to legacy applications, which may have been in existence long before the deployment of the middleware. The legacy applications still require user authentication via the typical means of providing a user identity and a password in plain-text form while the middleware layer may be using a different authentication mechanism. Most of these solutions use the Secure Socket Layer (SSL) protocol to provide a secure cryptographic channel through which a password is passed on to the legacy application.

Figure 3C:
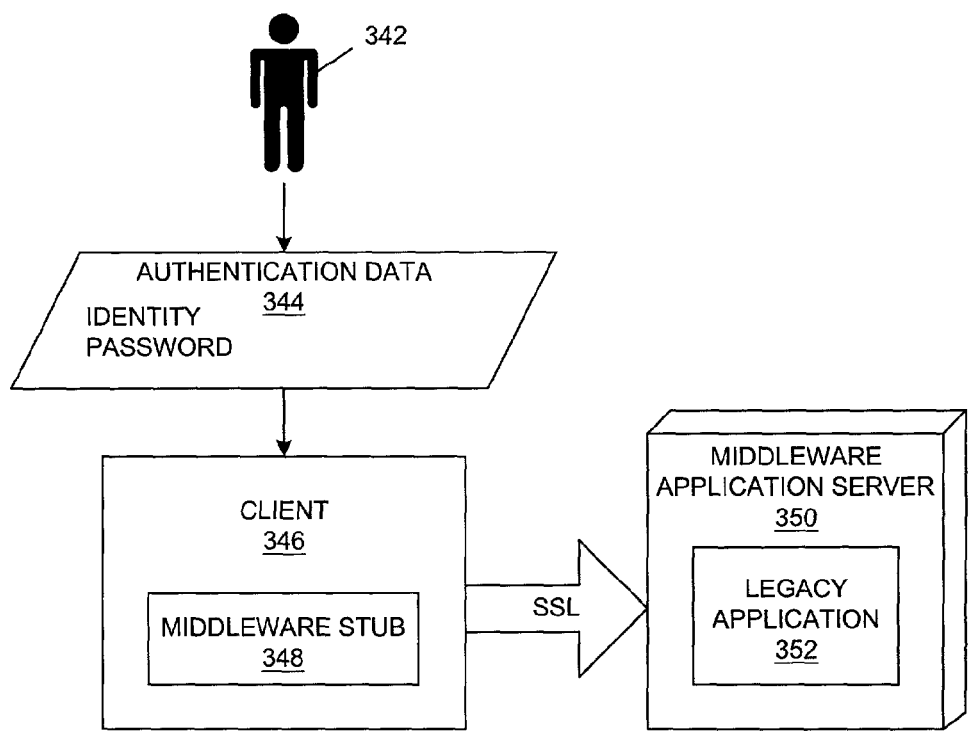
FIG. 3C is a block diagram depicting a typical manner in which an entity may use authentication data to be authenticated to a legacy system or application through a middleware layer.

With reference now to FIG. 3C, a block diagram depicts a typical manner in which an entity may use authentication data to be authenticated to a legacy system or application through a middleware layer. User 342 may engage in an authentication process with legacy systems and applications by supplying authentication data 344 comprising identity information and some type of secret information, such as a password, to client machine 346. Middleware stub 348 transmits authentication data to middleware application server 350 via the SSL protocol. Middleware application server 350 receives and decrypts authentication data 344 and then passes the authentication data to legacy application 352. After user 342 has been authenticated by legacy application 352, middleware application server 350 and middleware stub 348 support the transfer of data between client 346 and legacy application 352.

The use of SSL sessions are costly in terms of performance. Furthermore, the cryptographic protection is socket-to-socket only; a password is available in its plain-text form within the middleware application server's runtime environment immediately after the authentication data is decrypted, thereby introducing some vulnerability into the security mechanism. Hence, various other digital certificates have been proposed such that digital certificates can be used in a variety of authentication and authorization environments.

In order to facilitate the separation of authentication functions and authorization functions, a standard for an X.509 Attribute Certificate (AC) has been proposed by which attribute certificates (ACs) would be similar in structure to public key certificates (PKCs) but in which the attribute certificate would not contain a public key. An attribute certificate would be used to certify or otherwise securely bind a set of authorization capabilities to its subject holder. Those capabilities are preferably authenticated and then cryptographically verified by a target service sought by the holder of the attribute certificate, and the attribute certificate may then be used for enabling access to controlled resources.

A common analogy using passports and visas has been widely disseminated to explain the differences between public key certificates and attribute certificates. A public key certificate can be analogized to a passport: each identify the holder of the document; each have relatively long validity periods; and each require significant effort to obtain a valid document.

In contrast, an attribute certificate can be analogized to a visa. A visa is used to gain access somewhere in a manner similar to using an attribute certificate to gain access to a system. In addition, a visa must be accompanied by a passport that verifies/authenticates the identity of the holder of the passport and the visa. Similarly, an attribute certificate must be accompanied by a public key certificate to verify/authenticate the identity of the user. A visa is issued by an authority other than the authority that issues a passport, which is similar to an attribute certificate being issued by an authority different from the authority that issues the public key certificate. A visa and an attribute certificate have shorter validity periods than a passport or a public key certificate.

Public key certificates can provide an identity for controlled access purposes. However, merely proving one's identity does not provide one with access to a controlled resource. Instead, a role or group-membership is used; if the user can prove one's identity and that the identity has been previously associated with a role or a group membership, then one may gain access to a controlled resource.

Although it is possible to do so, placing authorization information in a public key extension can be problematic. For example, a user may have a valid identity for a relatively long period of time, but the user's authorized access privileges may change over time with each authorization period being shorter than the valid period of time for the user's identity. If one were to place the authorization information in a public key extension, then the public key certificate would have to be reissued when the user's privileges change, which would cause a significant administrative burden.

In other words, the concept of an X.509 Attribute Certificate, to which an X.509 V3 Public Key Certificate is a fundamental aspect, seeks to certify or securely bind a set of authorization capabilities to a subject in the same manner that an X.509 public key certificate binds a public key to that subject. The rationale behind the distinction between these two types of certificates is dictated by the dynamic nature of authorization roles that a particular entity can assume over a period of time while in possession of the same public key certificate.

Another problem, as was noted above, is that the authority that issues the public key certificate to verify the identity of a person is usually not the same authority that desires to authorize that person for use of particular systems. In fact, a preferred scheme would have relatively few public key certifying authorities on which many other institutions rely while these other institutions determine the authorization parameters for each individual institution. If the authorization information is placed into a public key extension, then the public key certifying authority must obtain authorization information from each institution to which the user desires to present the public key certificate, which is very difficult administratively.

Hence, it has been recognized that the public key infrastructure would be better served by separating authorization information from authentication information. However, authorization information must still be bound to a holder's identity to be useful.

In order to facilitate such a scheme, an attribute certificate provides a binding between a certificate holder and a set of attributes; the attribute certificate is a digitally signed (or certified) identity and set of attributes. After acquiring an attribute certificate, a user may present the attribute certificate in an attempt to gain access to a controlled resource. When a decision must be made concerning whether a user should have access to the controlled resource, the deciding authority needs to verify the identity of the holder of the attribute certificate.

Hence, an attribute certificate is generally proffered along with a public key certificate to access various security services, access controlled services, authentication services, etc. The attribute certificate contains some type of information that links the attribute certificate with a public key certificate, and the public key certificate is used for authentication purposes in conjunction with a request to access the controlled resource.

Figure 3D:
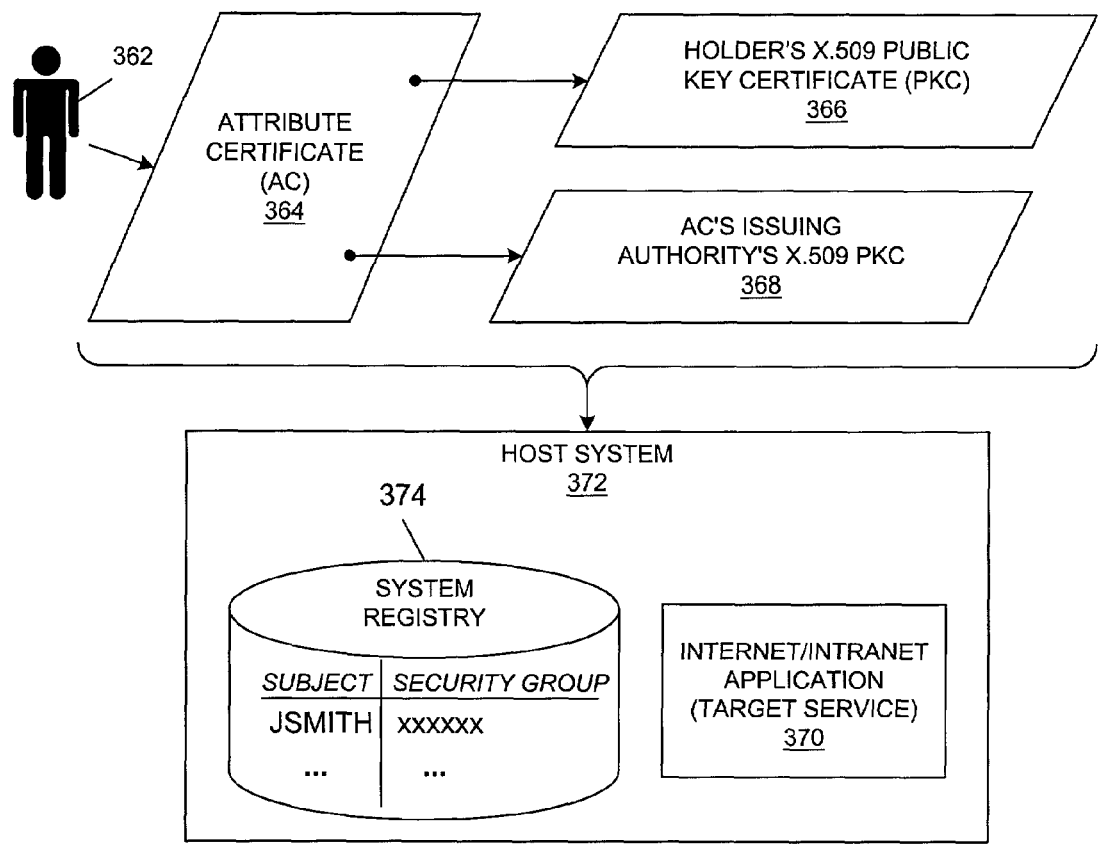
FIG. 3D is a block diagram depicting a typical manner in which an entity may use a digital certificate and an accompanying attribute certificate to be authenticated and authorized to an Internet system or application in order to be granted access to controlled resources.

With reference now to FIG. 3D, a block diagram depicts a typical manner in which an entity may use an attribute certificate and its associated public key certificates to be authenticated and authorized to an Internet system or application in order to be granted access to controlled resources. User 362 possesses X.509 attribute certificate 364. User 362 sends attribute certificate 364, along with the user's associated PKC 366 and PKC 368 of the issuing authority for the user's attribute certificate, to Internet/intranet application (target service) 370 that comprises X.509 functionality and that operates on host system 372. As noted previously, an attribute certificate may contain attributes that specify group membership, role, security clearance, or other authorization information associated with the holder of the attribute certificate. Host system 372 may also contain system registry 374 that allows user 362 to access services and resources within system 370 as specified by information within attribute certificate 364.

In summary, an X.509 attribute certificate is a document that has been cryptographically signed by an AC-issuing authority. This signing process uses the private key of the attribute certificate authority, for which there is a corresponding public key published in a public key certificate issued for the attribute-certificate-issuing authority.

An application service that contains PKIX-functionality uses the public key certificate of the user in conjunction with some predefined security protocol, such as SSL, in order to establish data origin authenticity/integrity or confidentiality during exchanges with a particular client. At some subsequent point in time, a user may attempt to access a controlled resource at a target service, and the user's access capabilities are determined from the user's attribute certificate. The user sends both his/her attribute certificate and public key certificate to the target service. The two certificates are linked together in some manner; in the X.509 specification, the "Holder" field in the attribute certificate contains linking information for the public key certificate, such as the identity of the public key certificate's issuing authority and the serial number of the holder's public key certificate.

After receiving the user's certificates, the public key certificate of the authority that issued the attribute certificate is needed in order to validate the attribute certificate that has been presented by the user. In general, the target service would be configured with information on all of the AC-issuing authorities that the target service is willing to accept or trust. The target service may accept the public key certificate of the AC-issuing authority as sent by the user, or the target service may retrieve the public key certificate of the AC-issuing authority from a public directory.

To facilitate using attribute certificates with legacy applications, the proposed specification for an X.509 Attribute Certificate includes an attribute type, "SvceAuthInfo", for service authentication. The "SvceAuthInfo" attribute identifies the AC holder to the server/service by a user name/identity, and the attribute may include optional service specific authentication information.

While not necessary, this attribute type would typically contain a user identity and password pair for a legacy application; the "authinfo" field of the "SvceAuthInfo" attribute type would usually be encrypted because it contains sensitive information, such as a password. In general, this attribute type provides information that can be presented by a user of a client application, i.e., the AC holder, to be interpreted and authenticated by a separate server application within the target system.

While it has been contemplated in the prior art that the "SvceAuthInfo" attribute type within a given attribute certificate would be encrypted to protect any sensitive information, the present invention provides a novel and elegant method by which an attribute certificate can contain password-based authentication information for one or more target legacy applications to implement network single sign-on functionality. In other words, a methodology and a system for achieving network single sign-on based on PKIX is presented. While the present invention may employ a variety of digital certificates, the preferred embodiment of the present invention employs digital certificates that are compliant with the X.509 family of standards.

With reference now to FIG. 4A, some of the fields of a standard X.509 digital certificate are shown. The constructs shown in FIG. 4A are in Abstract Syntax Notation 1 (ASN.1) and are defined within the X.509 standard.

With reference now to FIGS. 4B-4D, some of the fields of an X.509 attribute certificate are shown. The constructs shown in FIGS. 4B-4D are also in ASN.1 notation.

Figure 5:
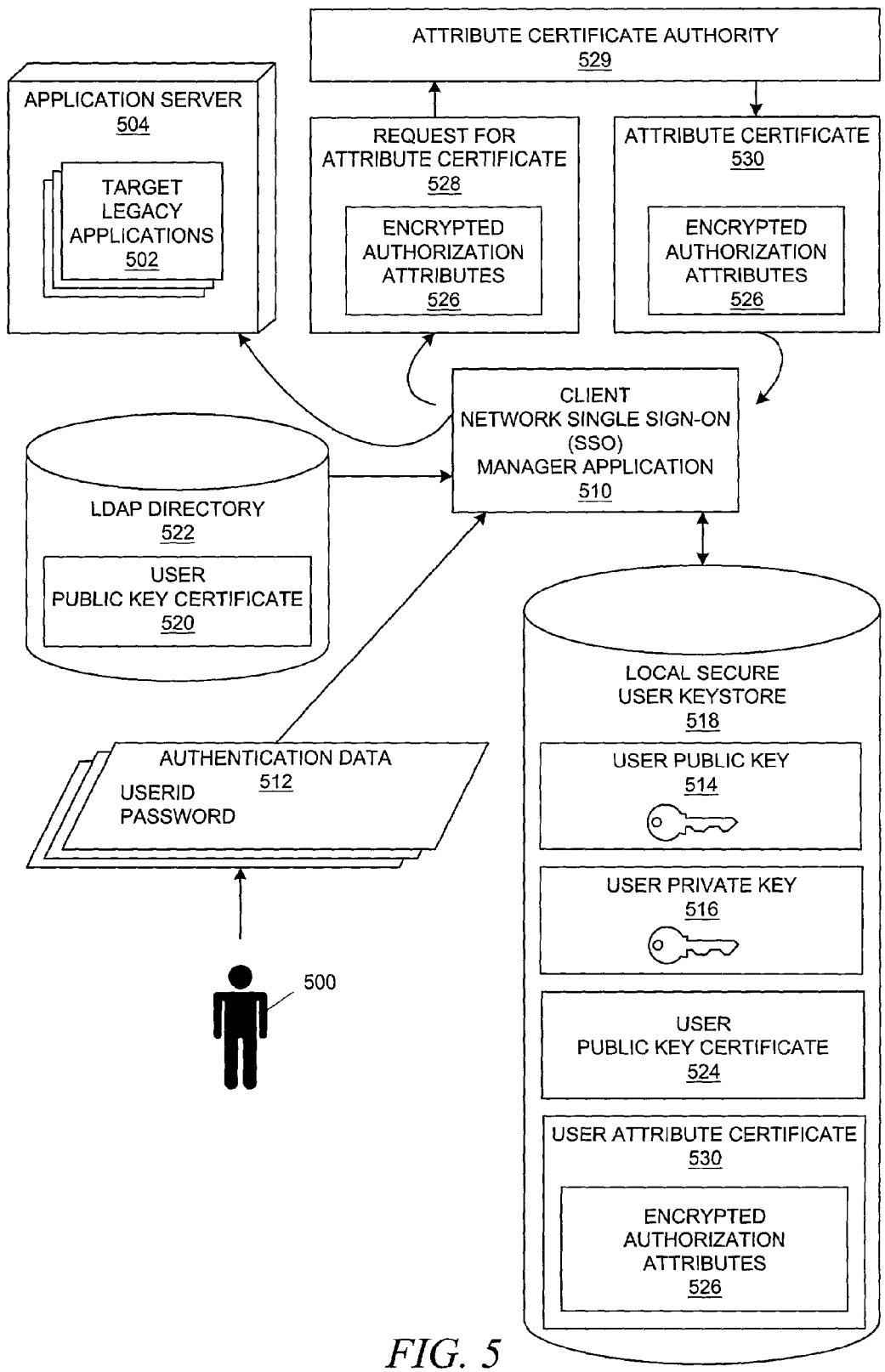
FIG. 5 is a diagram depicting a process for requesting an X.509 attribute certificate containing encrypted authorization attributes and also a process for using the X.509 attribute certificate to access a set of target legacy applications in a network single sign-on manner in accordance with a preferred embodiment of the present invention.

With reference now to FIG. 5, a diagram depicts a process for requesting an X.509 attribute certificate containing encrypted authorization attributes and also a process for using the X.509 attribute certificate to access a set of target legacy applications in a network single sign-on manner in accordance with a preferred embodiment of the present invention.

In the present invention, the attribute certificate contains one or more sets of authorization attributes for controlled resources, such as legacy applications, supported by a host system, an application server, a target service, or the like. In the preferred embodiment, the one or more sets of authorization attributes are inserted into a standard "SvceAuthInfo" field of an X.509 attribute certificate, as shown in FIG. 4D using ASN.1 notation.

It should be noted that the encrypted authorization attributes are not limited to being incorporated only within the X.509 standard and that the X.509 standard is merely one set of definitions of digital certificates into which the encrypted authorization attributes of the present invention could be incorporated; the present invention may also use other digital certificate standards or formats other than X.509 as long as the digital certificates can convey the required information. Additionally, it should be noted that the format of the encrypted authorization attributes could vary from the format shown in FIG. 4D.

In summary, a preferred embodiment of the present invention operates as follows. User 500 of a client device desires access to protected resources, such as target legacy applications 502, hosted on application server 504. After an initial configuration phase, which is discussed in more detail below, client network single sign-on (SSO) manager application 510 performs password management for user 500 such that, after user 500 completes a single authentication process with client SSO manager 510, client SSO manager 510 acts as an authentication agent to perform subsequent authentication processes that are required by target legacy applications 502. In other words, user 500 "logs onto" client SSO manager 510 once, after which client SSO manager 510 completes any necessary logon procedures. Common logon procedures are discussed in more detail further below after a discussion of the initial configuration process.

During an initial configuration process, since the client device may be used by many different users, client SSO manager 510 may maintain its own registry of user identities and passwords for challenging any user of the client device in the manager's role as an authenticating intermediary. User 500 operates client SSO manager 510 to request the creation of a secure user password account or user record within the manager application's registry, configuration file, or other appropriate datastore on the client device.

In a preferred embodiment, client SSO manager 510 uses the local secure user keystore associated with user 500 for secure storage of any authentication data required by client SSO manager 510. Client SSO manager 510 may possess its own public and private keys to be used to securely store user information.

User 500 also provides any necessary information for identifying the target legacy applications with which user 500 desires client SSO manager 510 to act as an intermediary. User 510 provides one or more sets of authentication data 512, each of which comprise a user identity and a password (or some other type of secret authentication token or data) or other additional information. For example, each set of authentication data may be used to access a legacy application, such as a legacy database application at a remote location like application server 504.

At this point, the client SSO manager has the information required to act as an authenticating intermediary for the user. However, the user's authentication data has not been securely stored, so the client SSO manager continues with the configuration process.

For its subsequent actions, client SSO manager 510 requires cryptographic keys belonging to user 500. At some previous point in time, a public/private key pair, such as user public key 514 and user private key 516, may have been generated for user 500, after which the key pair was safeguarded by storing them within local secure user keystore 518 in a manner that associates the key pair with user 500. The key pair may then be used for various PKIX purposes as required or allowed by user 500. If user 500 already has a key pair, then client SSO manager 510 retrieves the public key in the appropriate manner.

It should be noted that there may be multiple user keystores on the client device for general security applications and purposes required by the many users that use the client device. There may be variety of ways in which the local keystore is managed, and the client SSO manager may have the responsibility of managing a dedicated local keystore on behalf of the user. Alternatively, the client SSO manager may need to interact with another security application that manages the one or more local keystores. For example, Public Key Cryptographic Standard #11 (PKCS #11) defines a standard architecture for cryptographic hardware tokens, such as PCMCIA (Personal Computer Memory Card International Association) cards or smart cards, that enable a high level of data security. A cryptographic hardware token is a hardware repository for secret keys, certificates, one or more cryptographic engines, and a CPU to process the necessary public key-based cryptography functions. PKCS #11 allows any application to support independently-developed smart tokens. If tokens are properly designed, they cannot be copied or made to divulge their secrets, and they can be physically secured by the user just like a wallet, car keys, or other personal valuables.

The Public Key Cryptography Standards comprise a suite of specifications defined by a consortium of companies. PKCS enables the development of interoperable applications that use sophisticated public-key encryption, authentication and digital signature techniques to ensure data security. PKCS is a widely implemented and supported public key standard in the world and is compatible with other international standards, including CCITT X.500 and X.509 authenticated directories and certificates.

The user's private key is securely stored within the local secure user keystore, which may comprise a smart card or other physical token. However, the client SSO manager may obtain the user's public key from other sources. As explained in detail above, the user's private key must be kept confidential, but the public key can be published without compromising PKIX integrity. In FIG. 5, two copies of the user's public key certificate are shown as being stored in multiple locations: user public key certificate 520 stored within LDAP directory 522 for general public use; and a local copy of user public key certificate 524 stored within local secure user keystore 518. Other PKIX methodologies, such as certificate revocation lists (CRLs), may be used to ensure the integrity and consistency of the copies of the user's certificates.

Continuing with the configuration phase, client SSO manager 510 uses the public key belonging to user 500 to obtain or generate an attribute certificate in the following manner. Client SSO manager 510 encrypts one or more sets of authentication data 512 with the public key of user 500, thereby generating encrypted authorization attributes 526. The encrypted authorization information is then placed into request 528 for requesting an attribute certificate, along with associated identifying information for user 500 and target legacy applications 502 as required by the format of the request and/or attribute certificate, and sent to attribute certificate authority 529. In the preferred embodiment, the encrypted authorization information has been generated with an appropriate format so that attribute certificate authority 529 can copy it into an attribute certificate.

An attribute certificate may be used with more than one server or service. For each service, target legacy application, protected resource, application server, etc., that is being associated with the attribute certificate, identifying information for each service or server would also be sent in the request. Assuming that an X.509 attribute certificate is being used, the attribute certificate authority then places the identifying information into the "service" field of the "SvceAuthInfo" attribute of the attribute certificate; at a later time, a server, service, or application may retrieve its information within the attribute certificate by locating its appropriate "service" field. The identifying information for a service or server may be a host name that provides many services, a URL (Uniform Resource Locator) or URI (Uniform Resource Identifier), a qualified Web address, an IP address of an enterprise's server, etc.

The "indent" field of the "SvceAuthInfo" attribute type contains a user identifier/identity for the authentication information, while the "authinfo" field of the "SvceAuthInfo" attribute type contains the secret or confidential authenticating data, such as a password.

It should be noted that because the "SvceAuthInfo" attribute type is defined as a sequence, the attribute certificate allows for multiple sets of authentication data for multiple target applications; multiple sets of information can be marshaled into an attribute certificate as might be required in practical situations in which the user is in possession of multiple accounts for multiple protected resources.

In response to receiving the request, the attribute certificate authority generates and signs attribute certificate 530 that contains encrypted authorization attributes 526. Other fields of attribute certificate 530 would be filled with any appropriate or necessary data. Attribute certificate authority 529 then sends attribute certificate 530 to client SSO manager 510, which stores the attribute certificate for later use, preferably within local secure user keystore 518.

As noted above, in a preferred embodiment, client SSO manager 510 encrypts one or more sets of authentication data 512 with the public key of user 500. However, if only the authentication data is encrypted, and the attribute certificate is illegitimately copied or intercepted, then a third party could learn the identities or identifiers that are assigned to user 500 because these identifiers are associated with the authentication data but are not encrypted. While the identities alone are not sufficient for the third party to illegitimately pose as user 500, the identities could be used for some type of malicious purpose.

Hence, in an alternative embodiment, client SSO manager 510 uses a public cryptographic key to encrypt the entire "SvceAuthInfo" structure, which is defined as a sequence, as noted above. In other words, the entire "SvceAuthInfo" structure is encrypted to become a single attribute that is then used as encrypted authorization attribute data 526. This single, encrypted attribute is then stored with an identity/identifier associated with the user, the client SSO manager application, or preferably a combination of the two. In this embodiment, the client SSO manager application becomes the service associated with the user's single attribute, which itself contains all of the user's authentication data that eventually would be required by the client SSO manager to authenticate the user to the target legacy applications using an SSO methodology. In this manner, the attribute certificate securely hides the user's set of identities and the number of user identities being managed by the client SSO manager. Depending upon the implementation, this single attribute could be encrypted using the user's public key or the client SSO manager's public key, depending upon the level of security that is desired.

It should be noted that, in the preferred embodiment, the client SSO manager requests and receives an attribute certificate from an attribute certificate authority because it is assumed that the client SSO manager adheres to all PKIX protocols. By obtaining and storing an independently issued attribute certificate, the attribute certificate can be verified as an authenticate certificate by a third-party application. Moreover, if the client SSO manager were to be modified or replaced at some point in time, the attribute certificate could be independently verified as authenticate and then could be used by another SSO application.

On the other hand, if the client SSO manager is managing the attribute certificate for its own purposes without regard to possible verification of the authenticity and structure of the attribute certificate, then the attribute certificate is effectively only used as a datastore for the user's SSO authentication data. In that case, the client SSO manager may generate the entire attribute certificate itself rather than obtaining the attribute certificate from the attribute certificate authority.

After obtaining or generating the attribute certificate, thereby completing the configuration phase, user 510 will, at some subsequent point in time, desire to interact with one or more legacy applications 502 on application server 504. Using an appropriate protocol with client SSO manager 510, application server 504 initiates a session for user 500 and requests the user's authentication information for one or more legacy applications. For simplicity of presentation, it can be assumed that the user is initially attempting to access only a single protected resource.

Preferably before, but possibly after, initiating the session with the application server, the client SSO manager challenges the user to complete an authentication process. Assuming that the user successfully completes this initial sign-on process, the client SSO manager acts as the user's agent to perform any subsequent authentication processing on behalf of the user.

Continuing with the example, client SSO manager 510 retrieves attribute certificate 530 containing encrypted authentication attributes 526. Client SSO manager 510 locates the appropriate "SvceAuthInfo" attribute within attribute certificate 530 using the "service" field that corresponds to the legacy application that the user is attempted to access. Client SSO manager 510 then extracts the associated "authinfo" data for the corresponding legacy application.

At this point, the "authinfo" data comprises an encrypted octet string with the user's authentication data, which is probably solely a password but possibly comprising other data. Client SSO manager 510 then retrieves user private key 516 from local secure user keystore 518 to decrypt the "authinfo" data and extract the portion of the "authinfo" data that is required by the legacy application for which the client's SSO transaction is occurring. The required authentication data is then forwarded to application server 504 as appropriate, and user 500 is then able to use the legacy application. If the user decides to access another protected resource, then the user is not burdened with another authentication challenge.

Referring back to FIG. 3C, middleware stub 348 uses the SSL protocol to provide a secure cryptographic channel through which a password is passed on to the legacy application. In a similar fashion, it can be assumed that client SSO manager 510 uses any appropriate secure communication channel, such as SSL, to transmit the authentication data for user 500 to application server 504.

Figure 6:
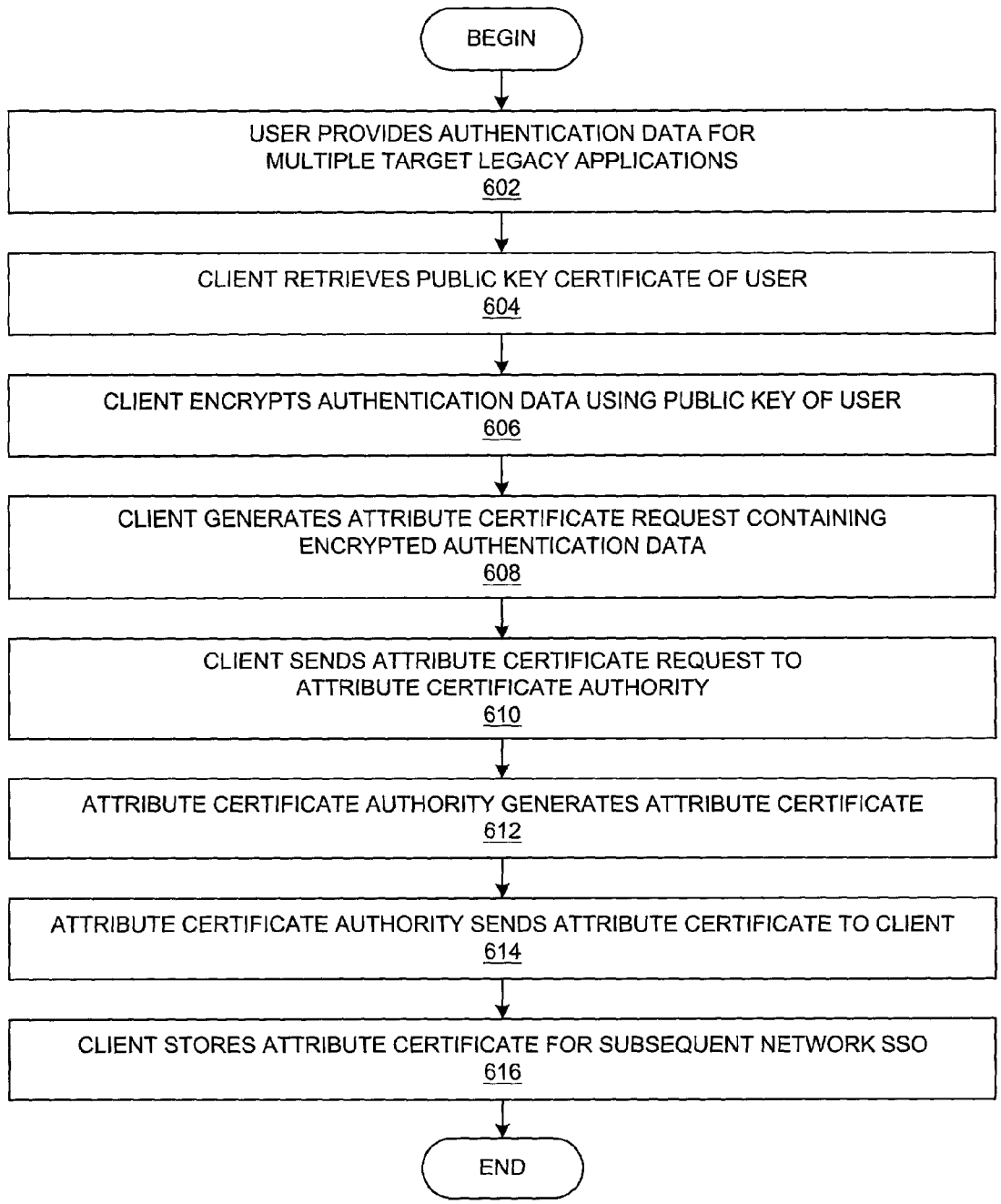
FIG. 6 is a flowchart depicting a process for obtaining an attribute certificate that will support authenticating a certificate holder to multiple target legacy applications in a network single sign-on manner in accordance with a preferred embodiment of the present invention.

With reference now to FIG. 6, a flowchart depicts a process for obtaining an attribute certificate that will support authenticating a certificate holder to multiple target legacy applications in a network single sign-on manner in accordance with a preferred embodiment of the present invention. The process shown in FIG. 6 is similar to a portion of the configuration phase processing that was described with respect to FIG. 5.

Figure 7:
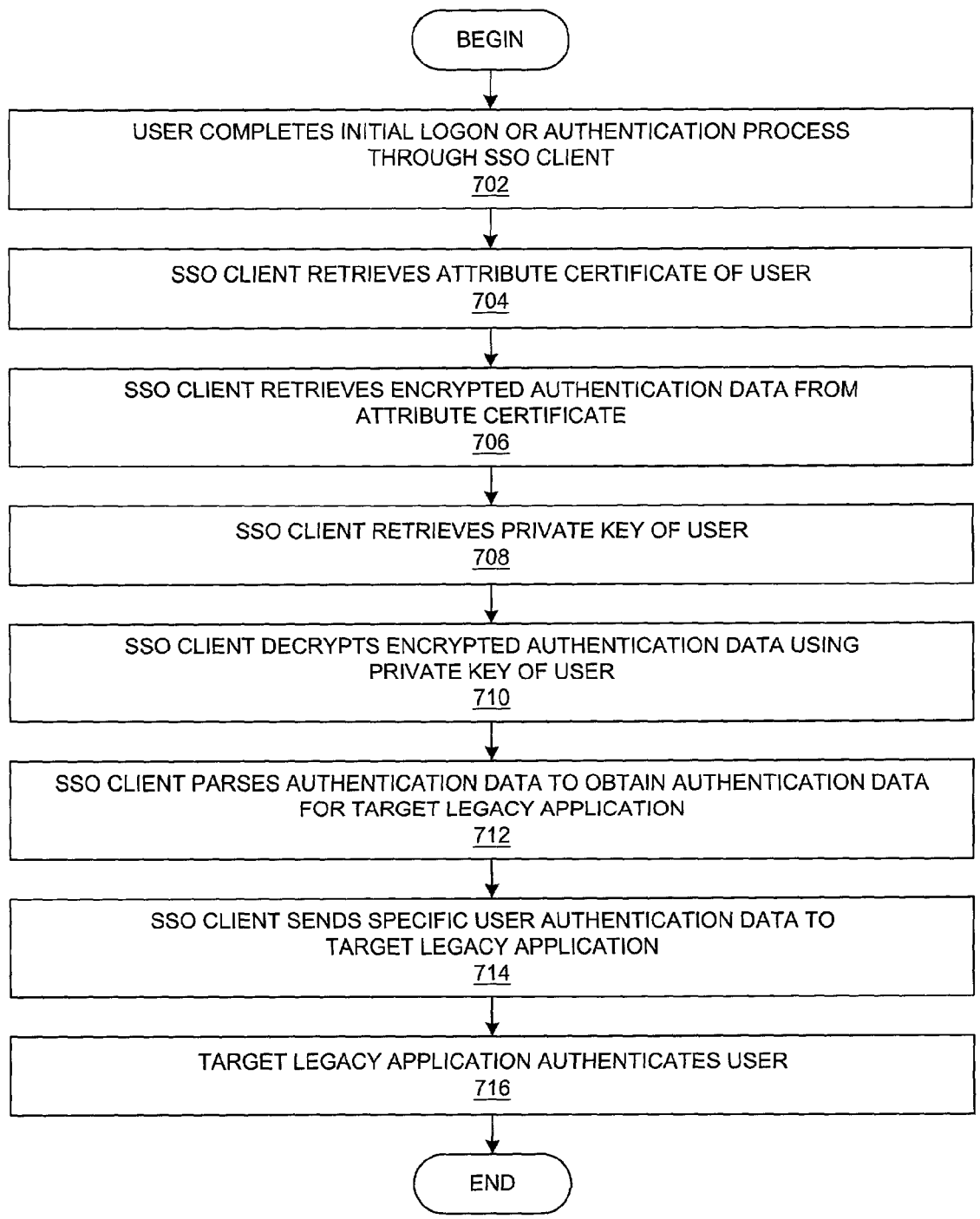
FIG. 7 is a flowchart depicting a process for using an attribute certificate to authenticate a certificate holder to multiple target legacy applications in a network single sign-on manner in accordance with a preferred embodiment of the present invention.

The processing begins in FIG. 6 with a user at a client system who desires to configure a network single sign-on account/application that will provide access to a set of protected resources, such as target legacy application; FIGS. 6-7 use a set of target legacy applications as the exemplary protected resources. Preferably, the user operates an SSO management application on the client that performs the following steps on behalf of the user after gathering information from the user concerning the protected resources, the user's authentication data for the protected resources, etc.

As a first step, the user at the client provides the authentication data required by the target legacy applications (step 602). Alternatively, the client application may retrieve the required information from an existing secure datastore associated with the user, e.g., a legacy SSO database.

The client then retrieves the public key certificate of the user (step 604) and encrypts the authentication data using the user's public key that was retrieved from the user's public key certificate (step 606). Alternatively, the public key may be retrieved directly from a secure keystore.

The client generates an attribute certificate request containing the encrypted authentication data (step 608) and sends the attribute certificate request to an attribute certificate authority (step 610). Communication between the client and the attribute certificate authority may occur through some type of secure communication channel.

In response, the attribute certificate authority generates an attribute certificate containing the encrypted authentication data and signs the attribute certificate with the attribute certificate authority's private key as proof of the attribute certificate's authenticity (step 612). The attribute certificate authority then sends the attribute certificate to the client (step 614), and the client stores the attribute certificate for subsequent network SSO processes (step 616). The process of acquiring an attribute certificate according to the present invention is then complete.

With reference now to FIG. 7, a flowchart depicts a process for using an attribute certificate to authenticate a certificate holder to multiple target legacy applications in a network single sign-on manner in accordance with a preferred embodiment of the present invention. The process shown in FIG. 7 is similar to the network SSO portion of the processing that was described with respect to FIG. 5.

The processing begins in FIG. 7 with a user at a client system who desires to access one or more target legacy applications. Preferably, the user operates an application, such as a client SSO manager application, on the client that performs the following steps on behalf of the user.

As a first step, the client attempts to access the protected legacy application, and the client SSO manager challenges the user to complete an initial logon or authentication process through the client SSO manager (step 702). This may be done in a seamless manner such that the user is not necessarily aware that the logon process is through a client SSO manager rather than a direct logon to the protected legacy application. Alternatively, the client may specifically logon to an SSO application, which then allows a user to choose which legacy applications or protected resources to be used; the list may be determined from the list of services within the user's attribute certificate.

The client SSO manager retrieves the user's attribute certificate (step 704) and retrieves the encrypted SSO authentication data from the attribute certificate (step 706). The client SSO manager then retrieves the user's private key (step 708) and uses the user's private key to decrypt the encrypted authentication data (step 710).

The client SSO manager parses the decrypted authentication data to obtain the authentication data for the specific target legacy application or applications to be used for the user's transaction or with which the user is trying to interact (step 712). The client SSO manager then presents the specific user authentication data, such as a user identity and password, to the target legacy application or its agent (step 714). Assuming that the target legacy application successfully authenticates the user, the target legacy application then allows the client to perform additional processing (step 716). After the initial logon, the client SSO manager can repeatedly perform any authentication duties for the user for any protected resources for which authentication data has been stored within the attribute certificate. The process of using the attribute certificate according to the present invention is then complete.

It should be noted that many other common steps, such as verifying the authenticity of a public key certificate, have not been described with respect to FIG. 6 and FIG. 7. As another example, the attribute certificate authority may verify the identity of the user prior to issuing the attribute certificate, or the client SSO manager may verify the authenticity of the user's attribute certificate with the attribute certificate authority. One of ordinary skill in the art would recognize that other processing steps that are common to the processing of digital certificates may be involved and have been omitted for simplicity of presentation.

The advantages of the present invention should be apparent in view of the detailed description of the invention that is provided above. In prior art systems without network SSO, prompting a user for a user password on every new session imposes a burden on the user in many aspects. First, the user must manage all of the required passwords. Second, having to prompt for a password and wait for the user's response may slow down the service request process, and third, the user then experiences overall inconvenience with intermittent password prompts. Although centralized authentication applications using network SSO have attempted to alleviate these problems, network SSO systems are themselves becoming legacy applications. Moreover, these legacy SSO systems require a live network connection to the SSO server each time a user logs on whereas this invention does not have this restriction since the authentication processes are performed locally.

By using a novel manner of storing authentication data within an attribute certificate, the present invention allows an attribute certificate to be used with a set of legacy applications to achieve network single sign-on using PKIX. Besides providing a method for network SSO, the methodology of the present invention allows a set of security-sensitive passwords to reside in the runtime of a client application in an encrypted form until each password is needed for accessing one or more legacy applications supported by a host system. In addition, the present invention does not contribute any additional complexity to the usage model and certificate validation process of PKIX than the prior art methodologies for using attribute certificates.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A data structure embodied in a non-transitory computer readable medium and representing an attribute certificate for use in a data processing system, the data structure comprising:
   an issuer name;
   a signature;
   a holder name; and
   an attribute containing encrypted authentication data that was generated by encrypting multiple sets of authentication data for protected resources with a public key associated with a user by a network single sign-on (SSO) agent.

2. The data structure of claim 1 wherein each protected resource is a legacy application.

* * * * *